Figure 1:
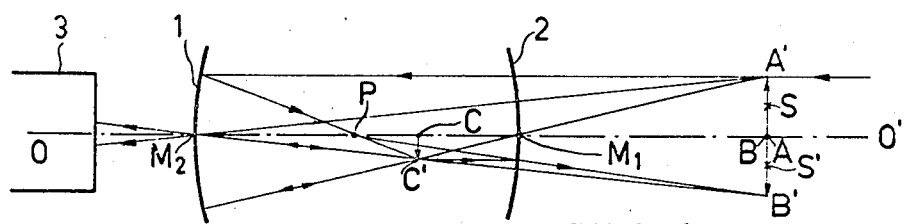

United States Patent
de Lang

[15] 3,694,091
[45] Sept. 26, 1972

[54] OPTICAL DEVICE FOR ALIGNING OBJECTS LOCATED AT AN ARBITRARY DISTANCE THEREFROM

[72] Inventor: Hendrik de Lang, Klein Vrijenban 1, Delft, Netherlands

[22] Filed: July 19, 1971

[21] Appl. No.: 164,096

Related U.S. Application Data

[63] Continuation of Ser. No. 780,926, Oct. 22, 1968, abandoned.

[30] Foreign Application Priority Data

Oct. 25, 1967 Netherlands..............6714459

[52] U.S. Cl....................................356/172, 350/294
[51] Int. Cl..............................................G01b 11/26
[58] Field of Search..............350/294, 299; 356/172

[56] References Cited

FOREIGN PATENTS OR APPLICATIONS 870,461   6/1961   Great Britain 950,765   2/1964   Great Britain Primary Examiner—Ronald L. Wibert
Assistant Examiner—Orville B. Chew, II
Attorney—Frank R. Trifari

[57] ABSTRACT

An alignment device employing two substantially identical aligned concave partially reflective mirrors where the center of curvature of each mirror is contained by the other mirror.

The device will form an inverted image of any object placed substantially along a line formed by the centers of curvature of the two mirrors. Any part of the object lying exactly in alignment with the line formed by the centers of curvature will be overlapped by a corresponding part of the image.

6 Claims, 1 Drawing Figure

PATENTED SEP 26 1972 3,694,091

INVENTOR.
HENDRIK DE LANG
BY
Frank R. Trifari
AGENT

OPTICAL DEVICE FOR ALIGNING OBJECTS LOCATED AT AN ARBITRARY DISTANCE THEREFROM

This application is a continuation of application Ser. No. 780,926, now abandoned The invention relates to an optical device for aligning objects located at an arbitrary distance therefrom.

It is known to use a telescope which is focused on the successive objects (points) to be aligned. The focusing process is often laborious. Moreover, it is very difficult to obtain a sufficiently accurate straight line guiding of the focusing mechanism.

The invention has for an object to avoid the disadvantages of the known device. It is characterized in that the device comprises two identical or substantially identical concave mirrors the reflective concave sides of which face each other and which each contain the center of curvature of the other mirror. Such a mirror system is sometimes referred to as an equi-confocal mirror system.

The invention is based on recognition of the fact that by means of an equi-confocal mirror system an inverted image is produced at natural size in the object plane outside the axis of the system irrespective of the distance therefrom.

For the production of the image, it is required that the light emitted from the object can enter the system and can then leave it again. In a favorable embodiment of a device according to the invention, the mirrors used are semi-transparent. It is also advantageous, however, to arrange a flat semi-transparent beam-splitting mirror between the concave mirrors, through which mirror the radiation from the object enters the system and leaves it again. The flat semi-transparent beam-splitting mirror is preferably made polarizing so that loss of light is prevented while with the same brightness the image and the object have different polarizations. The image formed from the object can be observed in different ways, for example, visually or photo-electrically.

Figure 2:
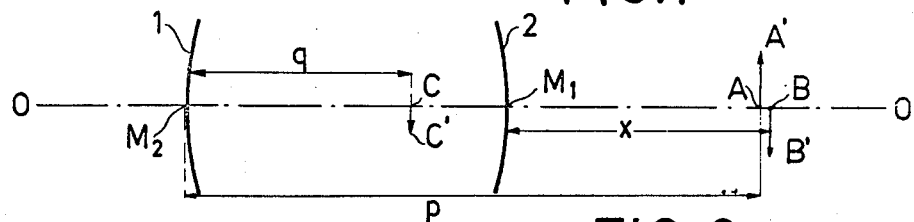
Figure 3:
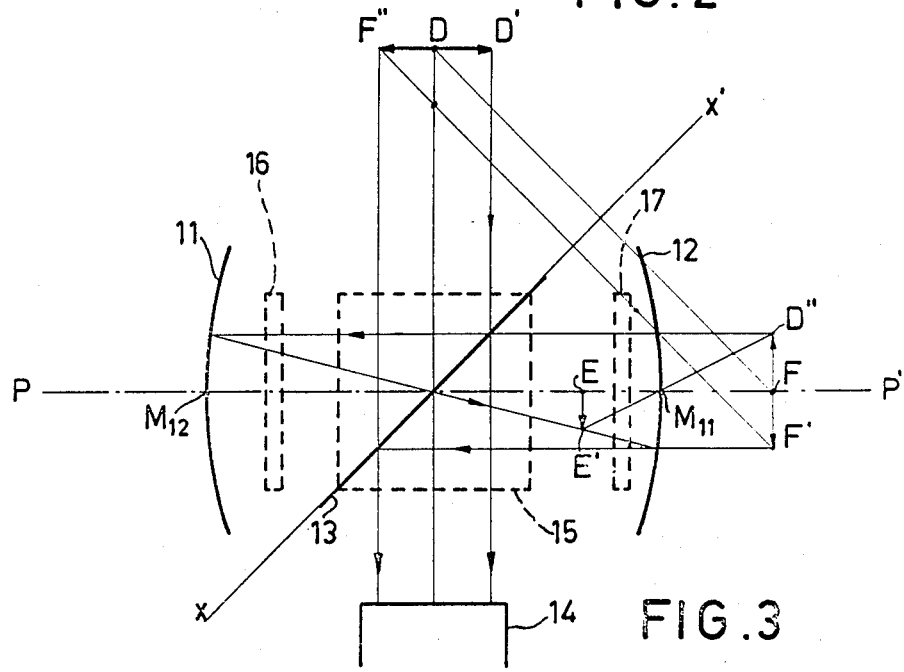
Figure 4:
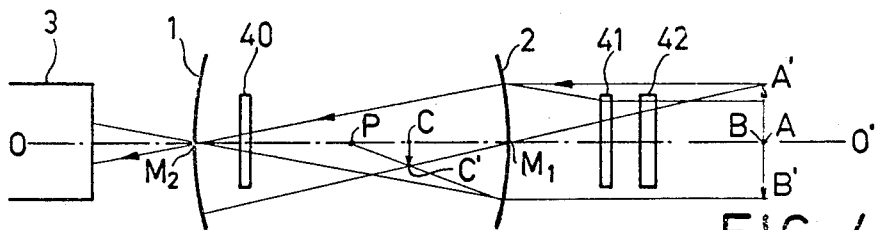

The invention will be described with reference to the drawing, in which;

FIG. 1 shows a first embodiment of a device according to the invention,

FIG. 2 serves to explain the operation of the device of FIG. 1,

FIG. 3 shows a second embodiment of a device according to the invention, and FIG. 4 shows an alternative embodiment of a device as shown in FIG. 1.

In FIG. 1, the identical spherical mirrors 1 and 2 are arranged so that the center of curvature $M_1$ of the mirror 1 is located on the mirror 2 and the center of curvature $M_2$ of the mirror 2 on the mirror 1. The line joining $M_1$ and $M_2$ defines the axis $00'$ of the system.

The object $AA'$ is illuminated by a light beam (originating from a light source not shown). The mirror 1, which is semi-transparent, forms the image $CC'$ of the object $AA'$, which image in turn constitutes an object which is imaged by the mirror 2, which is likewise semi-transparent. The position of the image $BB'$ formed by the mirror 2 can be calculated as follows.

Let it be assumed that the distance of the object $AA'$ from the mirror 1 is equal to $p$ and the radius of curvature of each of the two mirrors is equal to $r$ (FIG. 2). It then holds for the position of the image $CC'$ formed by the mirror 1 that: $1/p + 1/q = 2/r \ldots$ (1). In this formula, $q$ denotes the distance of the image $CC'$ from the mirror 1.

It also holds for the virtual image $BB'$ (of the object $CC'$) formed by the mirror 2 that:

$$1/CM_1 - 1/x = 2/r \text{ or } 1/(r-q) - 1/x = 2/r \quad (2).$$

In this formula, $x$ denotes the distance of the image $BB'$ from the mirror 2.

It can be readily calculated from the Equations (1) and (2) that: $x = p - r$. This means that the image $BB'$ lies in the plane of the object $AA'$. On account of the symmetry of the system, the length of the image is moreover equal to that of the object.

With the aid of a telescope 3, the position of a characteristic point $S$ in object $AA'$ and of its image point $S'$ in the image $BB'$ relative to the axis of the system can be clearly defined. By rotation and/or translatory movement of the system and hence of the axis $00'$, the points $S$ and $S'$ can be caused to coincide. As shown in FIG. 1 coincidence of a point on the object with a corresponding point on the image insures that the point is aligned with an imaginary line $M_1M_2$ through the centers of curvature of the mirrors. The system has the particular property that the distance $x$ of the object from the system can be chosen arbitrarily. By suitably shaping the object $AA'$, a suitable adjusting criterion is obtained. Three objects located at different distances from the system can be aligned by displacing them in a direction transverse to the axis of the system until each object coincides with its individual image. Similarly, the straight line guiding of a carriage of a machine tool can be checked by displacing the carriage in the direction of the axis of the system.

The device has the advantage that the axis of alignment is solely determined by the fixedly arranged confocal system comprising the mirrors 1 and 2. The telescope 3 is only used for observation, but does not influence the position of the axis of alignment.

In FIG. 3, the identical spherical mirrors 11 and 12, which substantially completely reflect the incident light beams, are arranged so that the center of curvature $M_{11}$ of the mirror 11 is located on the mirror 12 and the center of curvature $M_{12}$ of the mirror 12 on the mirror 11. The line joining $M_{11}$ and $M_{12}$ defines the axis $00'$ of the system. The semi-transparent mirror 13 is arranged at an angle of 45° to the axis $00'$.

The object $DD'$ is illuminated by a light beam (originating from a light source not shown). The semi-transparent mirror 13 transmits part of the light rays from the object $DD'$. The rays are reflected in part to the mirror 11. The mirror 11 forms an image $EE'$ of the object $DD'$ (or of the virtual object $FD''$ imaged with respect to the line $XX'$). This image is obtained in the same manner as the image $CC'$ of the object $AA'$ formed by the mirror 1 in the device shown in FIG. 1.

The image $EE'$ is in turn an object which is imaged by the mirror 12. The image of the object $EE'$ constitutes the virtual image $FF'$ which is again formed in the same manner as the virtual image $BB'$ in FIG. 1. When the virtual image $FF'$ is imaged with respect to the axis $XX'$, the virtual image $DF''$ is obtained which is observed together with the object $DD'$ by means of the telescope 14.

If the loss of light in the system should be limited, the mirror 13 may be in the form of a separation plane between two parts of a polarizing beam-splitting prism 15. It is then composed of reflective layers having alternately a high and a low refractive index. A ¼ λ-plate 16 and 17, respectively, is diagonally arranged between the prism and the mirror 11 and 12, respectively. The relative distance of the mirrors 11 and 12 must neutrally be adapted to the variation in optical path length due to the introduction of the beam-splitting prism 15.

The beam of natural light emitted from the object DD' is incident upon the surface 13 at the Brewster angle. By a suitable choice of the thickness of the reflective layers, it may be achieved that in the wavelength range concerned, the light beam is completely divided into two beams polarized at right angles to one another. The beam transmitted by the surface 13 and polarized in the plane of the drawing directly enters the telescope 14. The reflected beam, the direction of polarization of which is at right angles to the plane of the drawing, passes through the ¼ λ-plate 16, is reflected at the mirror 11 and again passes through the ¼ λ-plate 16. The plane of polarization of the returning beam has rotated by 90° with respect to that of the incoming beam. The returning beam, the plane of polarization of which is parallel to the plane of the drawing, is completely transmitted by the mirror 13, passes through the λ/4-plate 17 and is reflected by the mirror 12. The beam returning to the mirror 13 again passes through the λ/4-plate 17. The plane of polarization has again rotated by 90° so that the light incident upon the mirror 13 again has a direction of polarization which is parallel to the plane of the drawing. A complete reflection occurs at the surface 13. The reflected light is observed in the telescope 14. The light from the object DD' and the light from the virtual image DF" have orthogonal directions of polarization, i.e., a direction of polarization parallel to the plane of the drawing and a direction of polarization transverse to the plane of the drawing, respectively. This fact may be utilized in the electronic detection of the two light beams leaving the system.

FIG. 4 shows an alternative embodiment of the device shown in FIG. 1. Corresponding parts of these two devices are denoted by like, reference numerals. The light originating from the light source (not shown) again forms the image BB' of the object AA'. A polarizer 42 and a ¼ λ-plate 41 are arranged between the object AA' and the confocal system (1,2). This combination converts the natural light into circularly polarized light. The circularly polarized light passes on its way to the semi-transparent spherical mirror 1 the λ/4-plate 40 which converts the light into plane-polarized light having, for example, a plane of polarization parallel to the plane of the drawing. Consequently, the object AA' is observed through the telescope 3 in plane-polarized light having a plane of polarization parallel to the plane of the drawing. The virtual image BB' is formed by reflection at the mirror 1 and by subsequent reflection at the mirror 2. The light reflected at the mirror 1 passes through the λ/4-plate 40 and forms the image CC' which in turn forms the virtual image BB'. The image BB' is observed through the λ/4-plate in the telescope 3.

The light directly emitted from the object AA' has once passed through the λ/4-plate 40. The light emitted from the virtual image BB' has passed thrice through the λ/4-plate 40. The two light beams observed through the telescope 3 are therefore polarized in orthogonal directions. Due to the different planes of polarization, the image and the object can be subjected to a simple electrical processing.

The image and the object can be readily distinguished from each other not only by a suitable choice of their planes of polarization, but also in a different manner.

The coefficient of reflection of each of the mirrors 1 and 2 can be made frequency-dependent. This results in a color difference between the image and the object. The frequency-dependent reflection is obtained in that the mirrors 1 and 2 are composed of thin layers having alternately a high and a low refractive index.

What is claimed is:

1. An optical device for aligning an object located at an arbitrary distance from the device with a given imaginary line passing through the device, comprising a first concave semi-transparent mirror having a concave side facing the object, a second semi-transparent concave mirror substantially identical to the first mirror and positioned between the object and the first mirror, the second mirror having a concave side facing the first mirror and positioned so that the center of curvature of each mirror is contained by the other mirror on the imaginary line, whereby an inverted image of the object is formed in a plane containing the object and whereby a point on the object aligned with the imaginary line connecting the centers of curvature of the two mirrors is superimposed by a corresponding point on the image when viewed through the mirrors.

2. A device as claimed in claim 1, further comprising means aligned with the mirror centers for polarizing light from the object and for polarizing light from the image orthogonally with respect to the light from the object.

3. A device as claimed in claim 2, wherein the polarizing means comprise a first quarter-wave plate positioned between the concave mirrors, a second quarter-wave plate positioned between the second mirror and the object, and a polarizing plate between the second mirror and the object.

4. An optical device for aligning an object located at an arbitrary distance from the device with an imaginary predetermined line passing through the device, comprising a pair of concave substantially identical mirrors, each mirror having a concave surface facing the other mirror and positioned so that the center of curvature of each mirror is contained by the other mirror on a second imaginary line, a planar semi-transparent beam-splitting mirror positioned between the concave mirrors and intersecting the second imaginary line at an angle of 45°, the first predetermined imaginary line extending perpendicularly from the second imaginary line at the intersection of the plane of the semi-transparent mirror and the second imaginary line at an angle of 45° to the plane of the semi-transparent mirror, whereby an object placed on one side of the planar mirror in substantial alignment with the first imaginary line and remote from the device will result in the formation by the device of an image of the object observable from the other side of the planar mirror, whereby a point on the object exactly aligned with the first imaginary line is superimposed on a corresponding point of the image, and means positioned on the second imaginary line for polarizing light from the object and light from the image in mutually orthogonal directions.

5. Apparatus as claimed in claim 4, wherein the polarizing means comprises a polarizing substance on the planar mirror, and a quarter-wave plate positioned between the planar mirror and each of the concave mirrors at an angle of 45° to the plane of the planar mirror.

6. Apparatus as claimed in claim 4, wherein at least one of the mirrors comprises thin layers of alternately high and low refraction index material, whereby the coefficient of reflection of each mirror containing the alternate layers is frequency dependent.

* * * * *